(12) United States Patent
Follis (10) Patent No.: US 10,883,656 B1
(45) Date of Patent: Jan. 5, 2021

(54) APPARATUS TO ENABLE A HANDICAPPED PERSON TO INSTALL AND SERVICE A DEVICE ADJACENT A CEILING

(71) Applicant: Grant Follis, Altadena, CA (US)

(72) Inventor: Grant Follis, Altadena, CA (US)

( * ) Notice: Subject to any disclaimer, the term of this patent is extended or adjusted under 35 U.S.C. 154(b) by 0 days.

(21) Appl. No.: 16/742,187

(22) Filed: Jan. 14, 2020

(51) Int. Cl.
*F16M 13/00* (2006.01)
*F16M 13/02* (2006.01)

(52) U.S. Cl.
CPC ................................ *F16M 13/022* (2013.01)

(58) Field of Classification Search
CPC .......... F16M 13/00; F16M 11/00; E03C 1/06; A47B 21/06
See application file for complete search history.

(56) References Cited

U.S. PATENT DOCUMENTS

| | | | |
|---|---|---|---|
| 3,933,329 A * | 1/1976 | Granger | E03C 1/06 248/295.11 |
| 5,149,038 A | 9/1992 | VanCleve | |
| 5,281,954 A | 1/1994 | Harrison | |
| 5,380,967 A | 1/1995 | Steen et al. | |
| 5,594,422 A | 1/1997 | Huey et al. | |
| 5,833,192 A * | 11/1998 | Buhrman | E03C 1/06 248/295.11 |
| 6,036,330 A | 3/2000 | Sanguedolce | |
| 7,233,254 B2 | 6/2007 | Howell | |
| 8,371,547 B2 | 2/2013 | Wilkowske | |
| 10,376,042 B1 * | 8/2019 | Johnson | A47B 21/06 |
| 2005/0127258 A1 * | 6/2005 | Lapointe | G09F 7/18 248/218.4 |
| 2008/0117064 A1 | 5/2008 | Shin | |

* cited by examiner

*Primary Examiner* — Amy J. Sterling (57) ABSTRACT

An apparatus to enable people who are handicapped, especially those who are wheelchair bound, to be able to install and replace objects that are affixed near the ceiling. The apparatus includes a lower level affixed at a location within reach of a seated person and including a vertical height adjustment pole movably retained by plate at the lower level. A top plate retains a device which is positioned adjacent a ceiling. The top plate is affixed adjacent a top end of the vertical height adjustment pole. The vertical height adjustment pole is lowered to be in reach of the seated person to enable the seated person to work on the device retained on the top plate. After work on the device is completed, the vertical height adjustment pole is retained so that the top plate is adjacent a ceiling.

6 Claims, 11 Drawing Sheets

APPARATUS TO ENABLE A HANDICAPPED PERSON TO INSTALL AND SERVICE A DEVICE ADJACENT A CEILING

BACKGROUND OF THE INVENTION

1. Field of the Invention

This invention relates to the field of enabling a handicapped person, especially wheelchair bound persons, to install and service a device which is located adjacent a ceiling of a structure.

2. Description of the Prior Art

The following eight patents and published patent applications are the closest prior art related to the field of the invention which are known to the inventor.

1. U.S. Pat. No. 5,149,038 issued to Richard A. VanCleve on Sep. 22, 1992 for "Mounting Device for Smoke Alarm";

2. U.S. Pat. No. 5,281,954 issued to Frank Harrison on Jan. 25, 1994 for "Device for Replacing Battery in Smoke Alarm";

3. U.S. Pat. No. 5,380,967 issued to Carson D. Steen et al. on Jan. 10, 1995 for "Extension Actuator for Electrical Wall Switch";

4. U.S. Pat. No. 5,594,422 issued to Richard W. Huey et al. on Jan. 14, 1997 for "Universally Accessible Smoke Detector";

5. U.S. Pat. No. 6,036,330 issued to Michael Sanguedolce on Mar. 14, 2000 for "Light Switch Extender";

6. U.S. Pat. No. 7,233,254 issued to Byron H. Howell on Jun. 19, 2007 for "Lowerable Smoke Detector";

7. United States Published Patent Application No. 2008/0117064 to Jeong-Hun Shin on May 22, 2008 for "Fire Detector Having a Lifting Function";

8. U.S. Pat. No. 8,371,547 issued to Kathleen N, Wilkowske on Feb. 12, 2013 for "Detector Extender Support Systems".

SUMMARY OF THE INVENTION

The present invention is an apparatus to enable people who are handicapped, especially those who are wheelchair bound, to be able to install and replace objects that are affixed near the ceiling such as a smoke detector, a wireless doorbell, etc.

Tasks which are considered a simple operation for people who are fortunate enough to have no physical disability become difficult and virtually impossible for a handicapped person. Smoke detectors are most commonly mounted on a ceiling or on a vertical wall adjacent a ceiling. When the battery is no longer operable, the smoke detector emits a beeping signal. For a person who can climb a ladder, it is a simple task to place the ladder on the ground adjacent the location of the smoke detector, climb the ladder, remove the smoke detector cover, replace the battery which is usually a nine volt battery, replace the cover, and climb down the ladder. The simple task is impossible to perform for a wheelchair bound handicapped person.

It is a primary object of the present invention to create an apparatus which enables a wheelchair bound person to install and service a smoke detector located on a ceiling or located on a vertical wall adjacent a ceiling.

In addition, other objects such as a wireless doorbell, burglar alarm with sensors, and numerous other electronic devices require mounting on or adjacent a ceiling of a structure, especially for home use.

It is a further object of the present invention to provide an apparatus which enables a person to install, and if necessary, service or remove and repair, a device located on or adjacent a ceiling while the person is seated in a chair such as a wheelchair.

It is a further object of the present invention to provide an apparatus which is mounted on a vertical wall adjacent a light switch used as a frame of reference for position height to locate the lower level of the apparatus. Using a wall light switch as a frame of reference, the location to the lower level of the apparatus enables a seated adult to grasp and work with elements of the apparatus incorporated into the lower level or upper level adjacent the lower level.

It is also an object of the present invention to incorporate into the apparatus an upper level to which the device, such as a smoke detector, is affixed. In addition, a vertical height adjusting member enables the seated person to affix, repair and service the device when the apparatus upper level is adjacent the apparatus lower level and then move the upper level through the height adjustment member to a location on or adjacent the structure ceiling and affixing the height adjustment member after the apparatus upper level retaining the device is at the desired location.

It is a further object of the present invention to provide an apparatus which is mounted on a floor adjacent a vertical wall where the device is to be affixed. The floor mounted apparatus includes a lower lever apparatus having a vertical height adjustment to position the lower apparatus within reach of a person seated in a chair such as a wheelchair. While the base height location is the height of a wall light switch, this height is suitable for an adult having a standing height of five feet ten inches to six feet or taller. For a shorter person, such as a smaller woman, the lower apparatus can be lowered to any level above the floor so that it can be reached and grasped by the shorter person.

It is additionally an object of the present invention to incorporate into the floor mounted apparatus an upper level to which the device, such as a smoke detector, is affixed. In addition, a vertical height adjusting member enables the seated person to affix, repair and service the device when the apparatus upper level is adjacent the apparatus lower level and then move the upper level through the height adjustment member to the desired level of the device. Then, after the apparatus upper level retaining the device is at the desired location, the height adjustment member is fixed.

The vertical height adjustment member is a pole selected from the group consisting of an elongated pole having at least a flat longitudinal surface for the portion facing the vertical wall, an elongated pole having two oppositely disposed flat longitudinal surfaces with one longitudinal flat surface portion facing the vertical wall, and a cylindrical elongated pole.

It is a further object of the present invention to provide an apparatus which is mounted on a vertical wall adjacent a light switch used as a frame of reference for position height to locate the lower level of the apparatus with the apparatus hard wired into electricity within the vertical wall. Using a wall light switch as a frame of reference, the location to the lower level of the apparatus enables a seated adult to grasp and work with elements of the apparatus incorporated into the lower level.

It is also an object of the present invention to incorporate into the apparatus an upper level to which the device, such as a smoke detector, is affixed. In addition, a vertical height adjusting member enables the seated person to affix, repair and service the device when the apparatus upper level is adjacent the apparatus lower level. The upper level is then moved through the height adjustment member to a location on or adjacent the structure ceiling. The height adjustment member is affixed after the apparatus upper level retaining the device is at the desired location. The hard wiring is long enough to accompany the apparatus upper level to the final fixed location.

Further novel features and other objects of the present invention will become apparent from the following detailed description, discussion and the appended claims, taken in conjunction with the drawings.

BRIEF DESCRIPTION OF TILE DRAWINGS

Referring particularly to the drawings for the purpose of illustration only and not limitation, there is illustrated.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
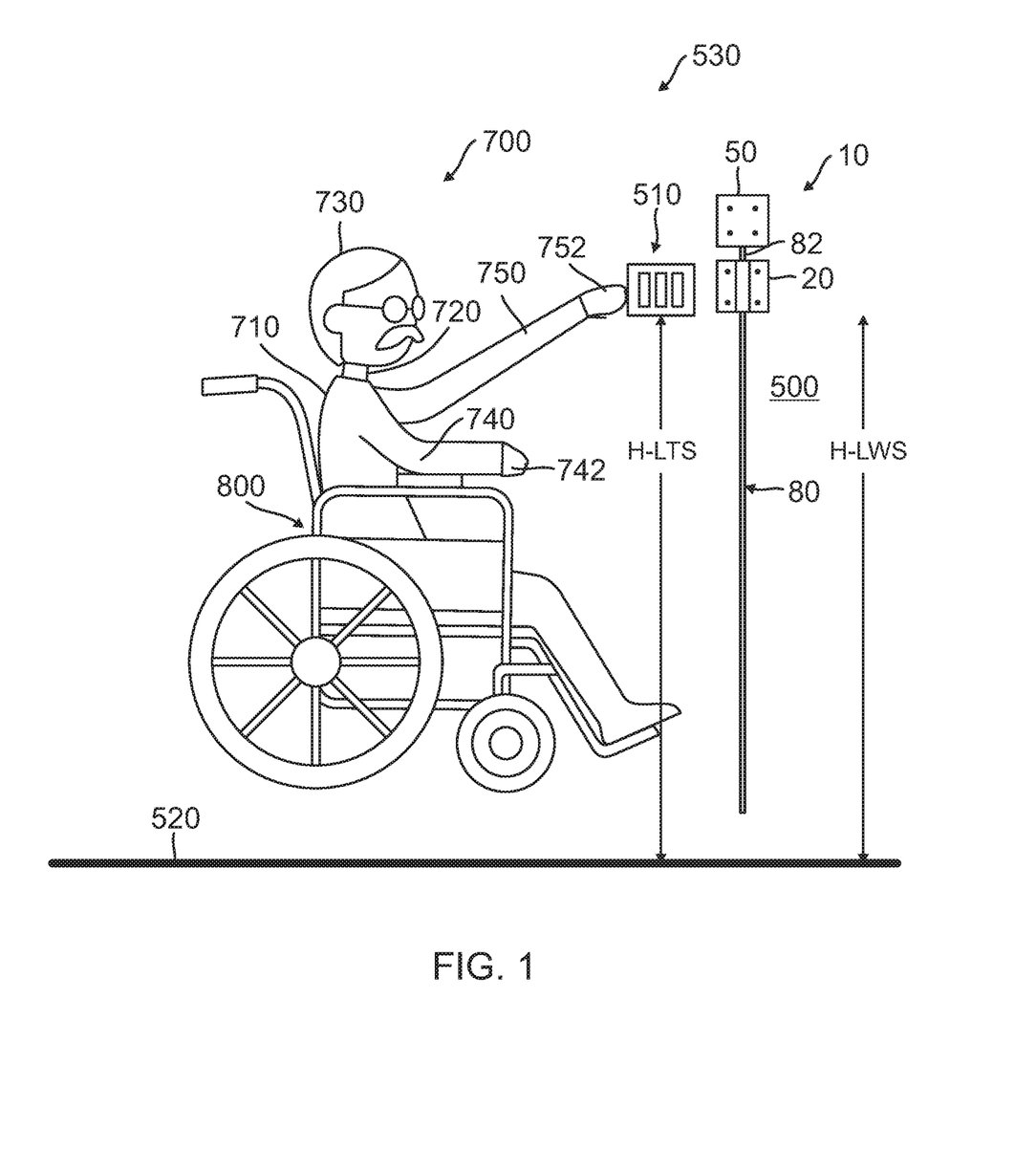
FIG. 1 is a front elevational view of a structure vertical wall with a wall light switch, a person seated in a wheelchair with hands elevated, and a front view of the present invention apparatus lower level, the upper level and the vertical height adjustment member.

Referring to FIG. 1, there is illustrated a front elevational view of a structure vertical wall 500 with a wall light switch 510 which is typically at a conventional height "H-LTS" of anywhere from forty-eight inches to fifty-two inches from the floor 520. Also illustrated is a side perspective view of a person 700 seated in a wheel chair 800. The illustration of the person 700 shows the rear portion of the torso 710, the person's neck 720, the person's head 730 and the person's right arm 740 and right hand 742 lowered and the person's left arm 750 and left hand 752 raised. The first embodiment of the present invention 10 includes a lower section 20 affixed to the vertical wall 500 at a vertical height "H-LWS" above the floor 520. In a preferred location, the lower section 20 is aligned with the light switch 510 and spaced apart from the light switch 510 so that it is within reach of the person's hands 742 and 752. It will be appreciated that it is within the spirit and scope of the present invention for the lower section 20 to be located at any portion of the vertical wall 500 as long as it can be reached by the seated person's hands 742 and 752 and allows for a length of a vertical height adjusting member 80 which will be discussed.

Further referring to FIG. 1, there is illustrated the apparatus upper level 50 affixed to a top end 82 of a vertical height adjusting member 80 which is an elongated column also including a bottom end 81. When lowered, the apparatus upper level 50 must be within reach of the seated person's hands 742 and 752.

Figure 2:
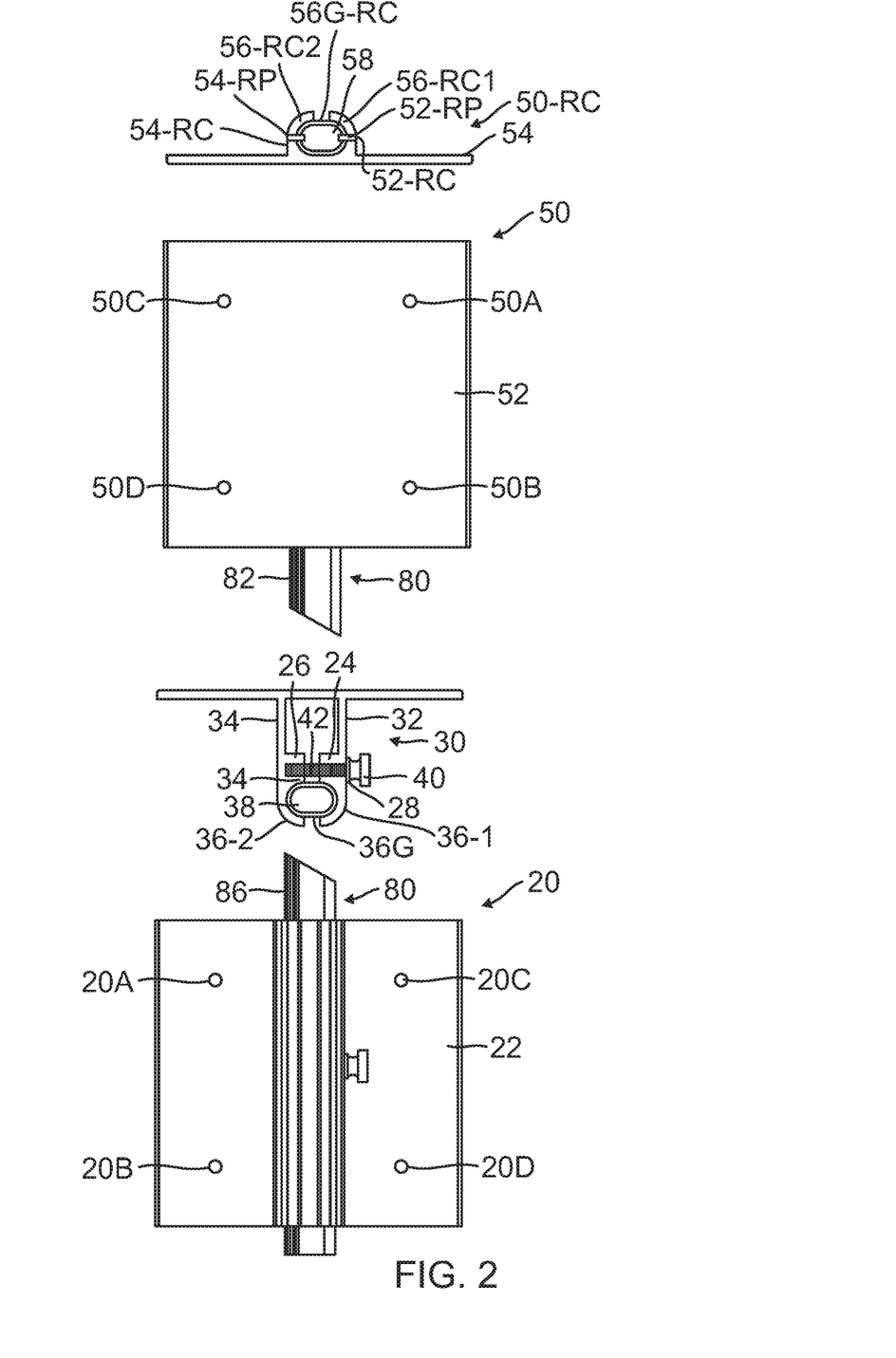
FIG. 2 is an exploded view with a front plan view of the present invention upper section and the upper section vertical height adjustment retaining member and a front perspective view of the present invention lower section and the lower section vertical height adjustment retaining member.

Referring to FIG. 2, there is illustrated an exploded view with a front elevational view of the present invention upper level 50 upper front plate 52 permanently affixed to a top 82 of vertical height adjustment member 80. As illustrated in the plan view behind upper front plate 52, the rear surface 54 is integrally formed with upper vertical height adjustment member retaining column 50-RC having a first transverse wall 52-RC, a parallel second transverse wall 54-RC and the arcuate front ends 86-TC1 and 86RC2 with a central gap 56G-RC surrounding a generally oval opening 58. The first transverse wall 52-RC includes a first retaining pin 52-RP inserted into one rounded end of vertical height adjustment member 80. The second transverse wall 54-RC includes a second retaining pin 54-RP inserted into an opposite rounded end of vertical height adjustment member 80. The upper front plate 52 is located in front of present invention lower section 20 to enable the seated person 700 to work on the device affixed to upper front plate 52.

Figure 3A:
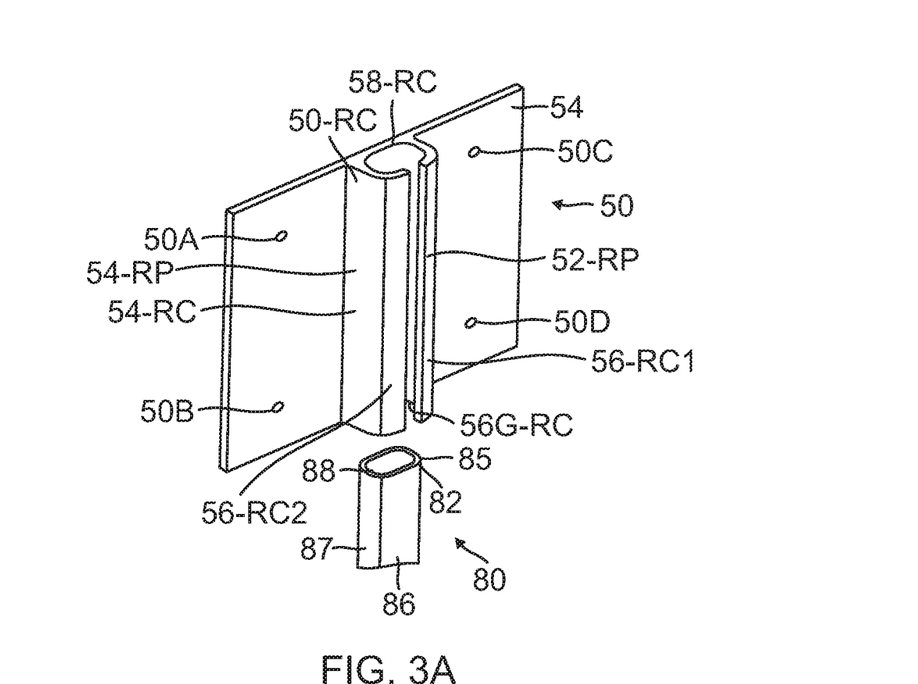
FIG. 3A is an enlarged rear perspective view of the upper section
Figure 3B:
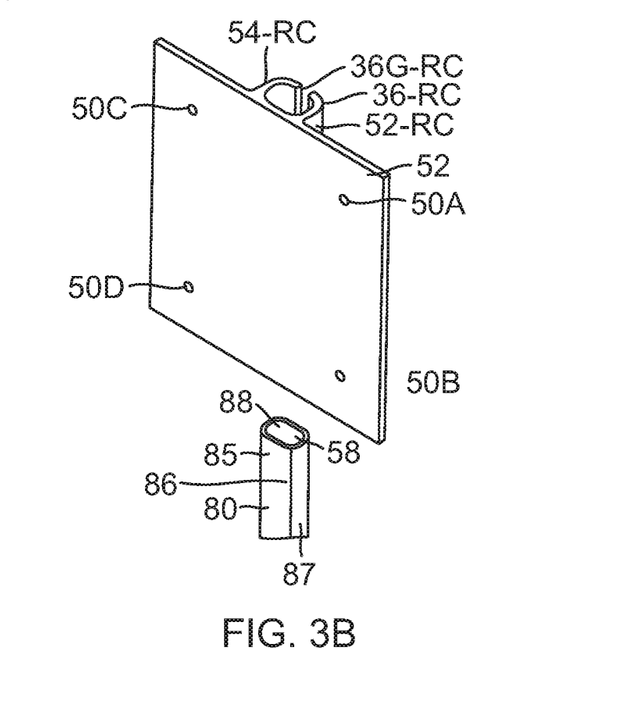
FIG. 3B is an enlarged front perspective view of the upper section.

Further referring to the lower portion of FIG. 2, there is illustrated a front plan view of the apparatus lower level plate 22 having four attachment openings 20A, 20B, 20C and 20D. Also illustrated in a separate view is a top view of one embodiment of the vertical height adjustment member retaining column 30 having a first transverse wall 32, a parallel second transverse wall 34 and the arcuate front ends 36-1 and 36-2, with a central gap 36G surrounding a generally oval opening 38. The first transverse wall 32 includes a threaded opening 28 (alternatively, an unthreaded opening) with a first interior threaded mating wall 24 through which a threaded retaining bolt 40 extends and ends a second interior threaded mating wall 26. The threaded retaining bolt 40 includes a threaded shaft 42 and a head 44. The threaded shaft 42 is threaded through threaded openings 24 and 26 and is stopped outside first transverse wall 32 by head 44, The detailed components are best illustrated in the enlarged views. FIG. 3A is an enlarged rear perspective view of the upper section 50 and FIG. 3B is an enlarged front perspective view of the upper section 50. Referring to FIGS. 3A and 3B, the upper level 50 upper front plate 52 is permanently affixed to a top 82 of vertical height adjustment member 80. As illustrated in the rear perspective view of FIG. 3A and front perspective view of FIG. 3B, the rear surface 54 is integrally formed with upper vertical height adjustment member retaining column 50-RC having a first transverse wall 52-RC, a parallel second transverse wall 54-RC and the arcuate front ends 56-RC1 and 56-RC2, with a central gap 56G-RC surrounding a generally oval opening 58-RC. The vertical height adjustment member 80 has an oval cross section with oppositely disposed longitudinal flat surfaces 86 and 88 with rounded ends 85 and 87. The first transverse wall 52-RC includes a first retaining pin 52-RP inserted into one rounded end 85 of vertical height adjustment member 80. The second transverse wall 54-RC includes a second retaining pin 54-RP inserted into an opposite rounded end 87 of vertical height adjustment member 80. The threaded retaining bolt 40 is tightened to cause the vertical height adjustment member 80 to be fixed in a given position. The upper front plate 52 is located in front of present invention lower section 20 to enable the seated person 700 to work on the device affixed to upper front plate 52.

While described as oval, it will be appreciated that it is within the spirit and scope of the present invention for the vertical height adjustment member 80 to be any shape including cylindrical with a round cross-section and the opening in the rertaining column 50-RC to have a marching shape such as round.

Figure 4A:
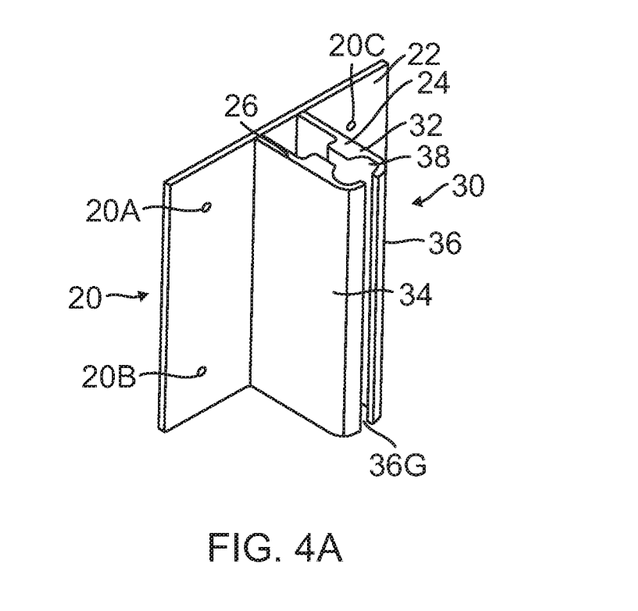
FIG. 4A is an enlarged front left side perspective view of the lower level plate.
Figure 4B:
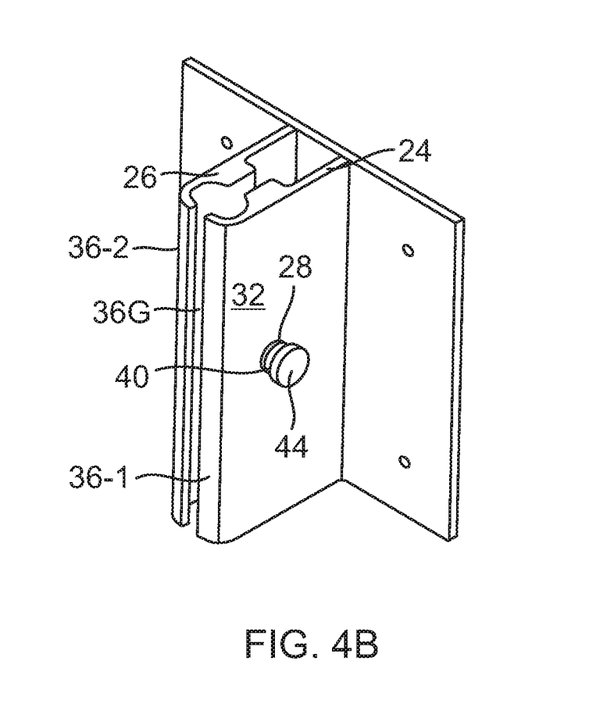
FIG. 4B is an enlarged front right side perspective view of the lower level plate.

Referring to FIG. 4A, there is illustrated a left side perspective view of the lower level plate 22 of the lower level 20. Referring to FIG. 4B, there is illustrated a right side perspective view of the lower level plate 22 of the lower level 20. Referring to FIGS. 2, 4A and 4B, there is illustrated the lower level plate 22 having four attachment openings 20A, 20B, 20C and 20D. Also illustrated is the vertical height adjustment member retaining column 30 having a first transverse wall 32, a parallel second transverse wall 34 and the arcuate front ends 36-1 and 36-2 with a central gap 36G surrounding a generally oval opening 38. The first transverse wall 32 includes a threaded opening 28 (alternatively, the opening is an unthreaded hole) with a first interior threaded mating wall 24 through which a threaded retaining bolt 40 extends and ends a second interior threaded mating wall 26. The threaded retaining bolt 40 includes a threaded shaft 42 and a head 44. The threaded shaft 42 is threaded through threaded mating walls 24 and 26 and is stopped outside first transverse wall 32 by head 44.

Figure 4C:
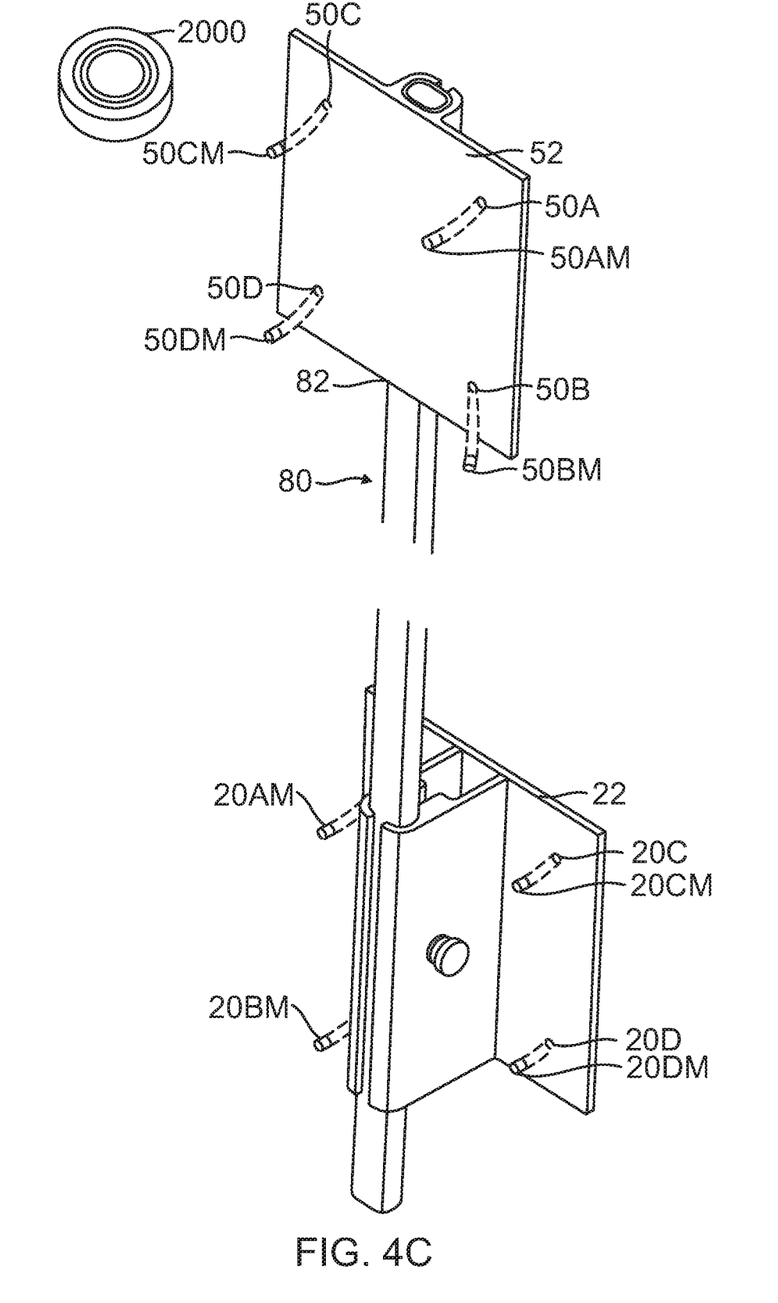
FIG. 4C is an exploded view illustrating the lower plate and how it retains the vertical height adjustment retaining member and the upper plate retained by its vertical height adjustment retaining member, and a smoke detectors illustrated exploded away from, the upper plate.

Referring to FIG. 4C, there is illustrated an exploded view illustrating the lower plate 22 and how it retains the vertical height adjustment retaining member 80 and the upper plate 52 retained by its vertical height adjustment retaining member 80, and a smoke detector 2000 exploded away from, the upper plate 52. The parts have already been described.

Mating screws 50AM, 50BM, 50CM and 50DM are used to affix smoke detector 2000 to upper plate 52 through respectively aligned openings 50A, 50B, 50C and 50D/. A key feature is that the upper plate 52 is retained in front of the lower plate 22 which is affixed to vertical wall 500 by mating screws 20AM, 20BM, 20CM and 20DM respectively aligned with openings 20A, 20B, 20C and 20D. Referring to FIG. 4C, there is illustrated present invention apparatus upper level retaining plate 52 affixed to the top 82 of the vertical height adjustment member 80 with four attaching openings 50A, 50B, 50C and 50D with a smoke detector illustrated in broken lines 2000 attached to the upper level retaining plate, illustrating the lower level retaining plate 20 with the components previously identified.

The lower plate 20 is affixed to the vertical wall 500 at the height as described in FIG. 1. The second plate 52 is lowered so that it is slightly above and in front of first plate 22. The device 2000, such as the smoke detector, is affixed to the second plate 52. The wheel chair bound person 700 installs the smoke detector 2000, replaces a battery, etc, while the second plate is in the lowered position.

Figure 5:
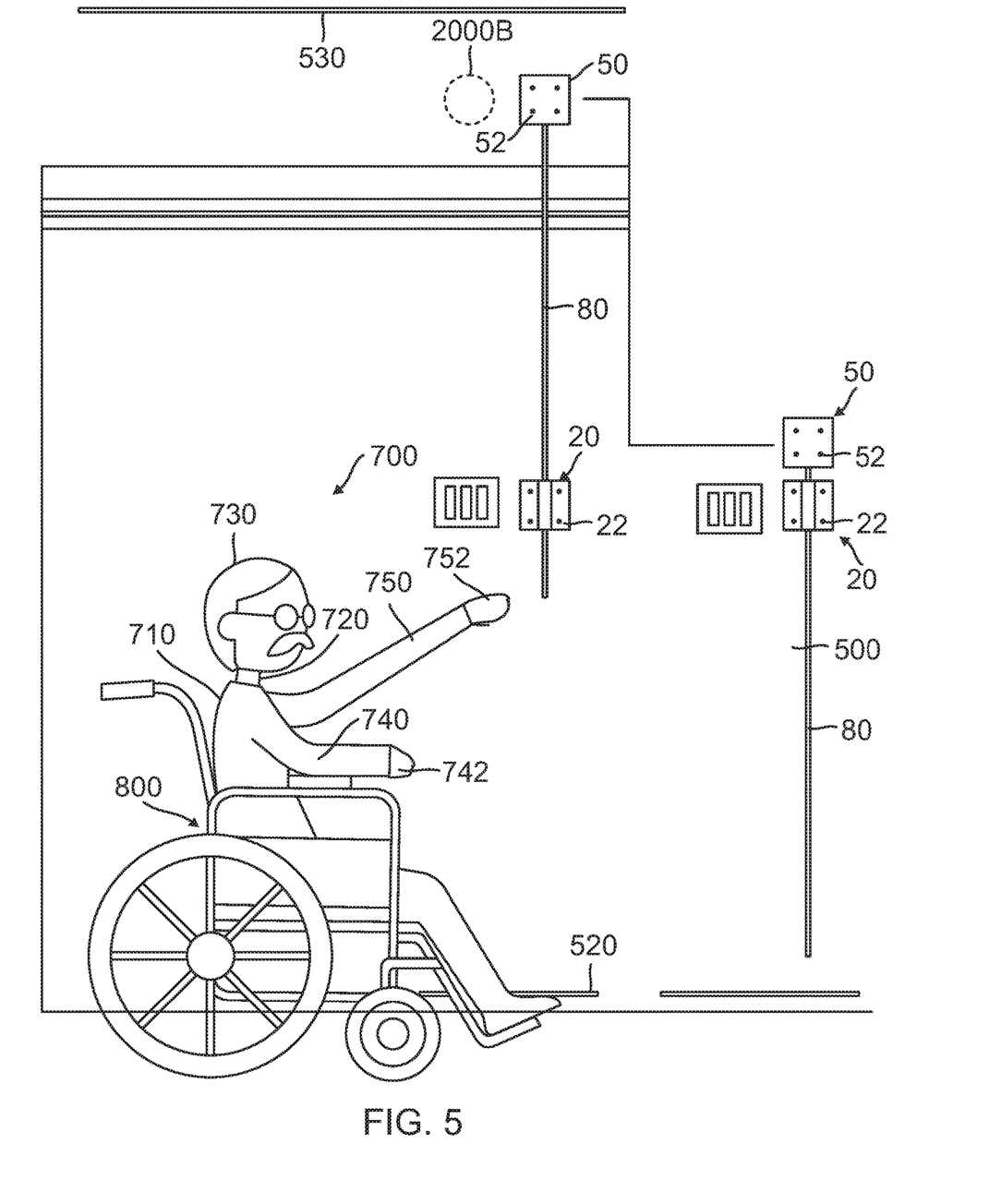
FIG. 5 is a front elevational view illustrating the second plate with the device moved to adjacent the ceiling, a person seated in a wheelchair after raising the second plate.

As illustrated in FIG. 5, after the person 700 has installed the device or replaced a battery in the smoke detector 2000 while the second plate 52 is lowered adjacent the first plate, as illustrated in FIG. 5, the person pushes upwardly on the vertical height adjustment member 80 to raise the second plate 52 to the desired height adjacent the ceiling 530 and then causes the bolt 40 to affix the vertical height adjustment member 80 as previously described. The person in the wheel chair has already been described in FIG. 1 and is illustrated again in FIG. 5 with the raised left hand 52 against the bottom of height adjustment member 80.

Figure 6:
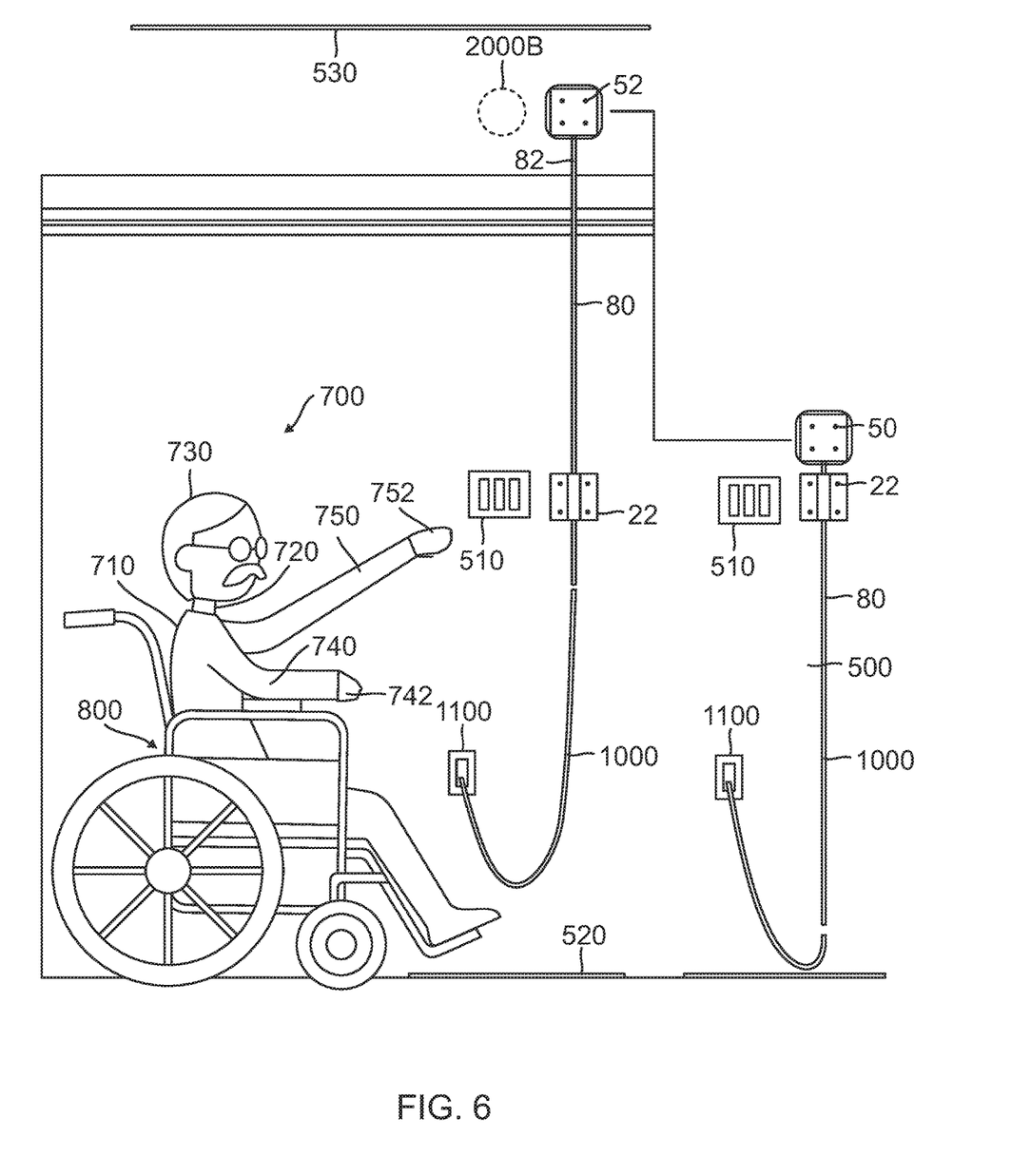
FIG. 6 is a front elevational view illustrating the second plate with the device moved to adjacent the ceiling, with the device electrically hardwired a person seated in a wheelchair after raising the second plate.

If the smoke detector is hard wire into an electrical outlet 1100, the apparatus is the same but the electrical wire 1000 needs to be long enough to move to the location near the ceiling, as illustrated in FIG. 6.

Referring to FIG. 6, there is illustrated present invention apparatus upper level retaining plate 52 affixed to the top 82 of the vertical height adjustment member 80 with four attaching openings 50A, 50B, 50C and 50D with a smoke detector illustrated in broken lines 2000B attached to the upper level retaining plate 52, illustrating the lower level retaining late 22 with the components previously identified. In FIG. 6, the device is electrically hard wired with an electrical cable 1000 hard wired into an electrical outlet 1100. The operation is the same as previous described but the electrical cable 1000 needs to be long enough to reach the ceiling level where the device 2000B is affixed to second plate 52 is raised.

After the device, such as smoke detector 2000 is installed onto apparatus upper retaining plate 52 or serviced such as changing a battery, the person pushes upwardly on the oval shaped vertical height adjustment member 80 until the apparatus upper level retaining plate 52 is adjacent ceiling 530 on an adjacent vertical wall 500 and the threaded retaining 40 is tightened as previously described to affix the apparatus upper vertical plate 52 with smoke detector to adjacent the ceiling 530 as illustrated in FIGS. 5 and 6. The person in the wheelchair has already been described in FIG. 1 and is illustrated again in FIG. 6 with the raised left hand 52 against the bottom of height adjustment member 80.

Therefore, through the present invention, a handicapped person seated in a wheelchair can install and service a device positioned at a vertical height adjacent a ceiling 530 of the structure.

Figure 7:
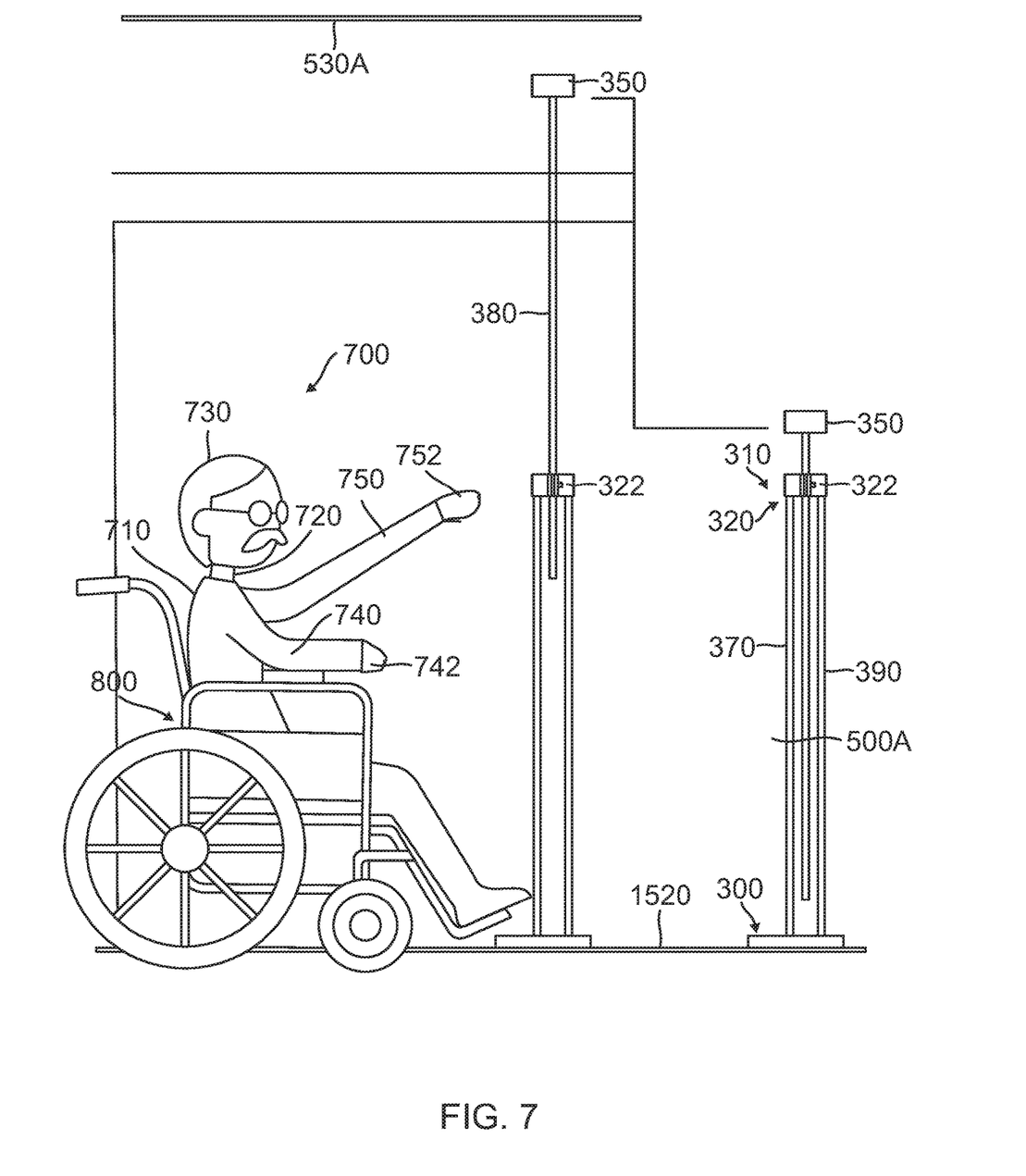
FIG. 7 is a front elevational view of a structure vertical wall, a person seated in a wheelchair, and a front view of an alternative embodiment of the present invention apparatus lower level movably affixed on a pair of poles affixed to a floor plate, the upper level and the vertical height adjustment member.

Referring to FIG. 7, there is an alternative variation of the present invention 310 wherein there is a floor mounted plate assembly. There is a plate 300 attached to the floor 1520 and then a pair of poles 370 and 390 affixed to the plate 300. The poles support present application lower section 320 which includes a lower plate 322 affixed at a height which is reachable by an adult seated in a wheelchair. The distance from the lower plate 322 to the ground floor 1520 is initially between forty-eighty and fifty-two inches. The lower plate 322 includes a front retaining member to retain the vertical height adjustment member 380. The person seated in a wheel chair has already been described in FIG. 1 and is illustrated with the person's left hand 752 at the bottom of height adjustment member 380 after the top section which will retain an object such as a smoke detector has been raised to a location adjacent the ceiling 530A.

Figure 8A:
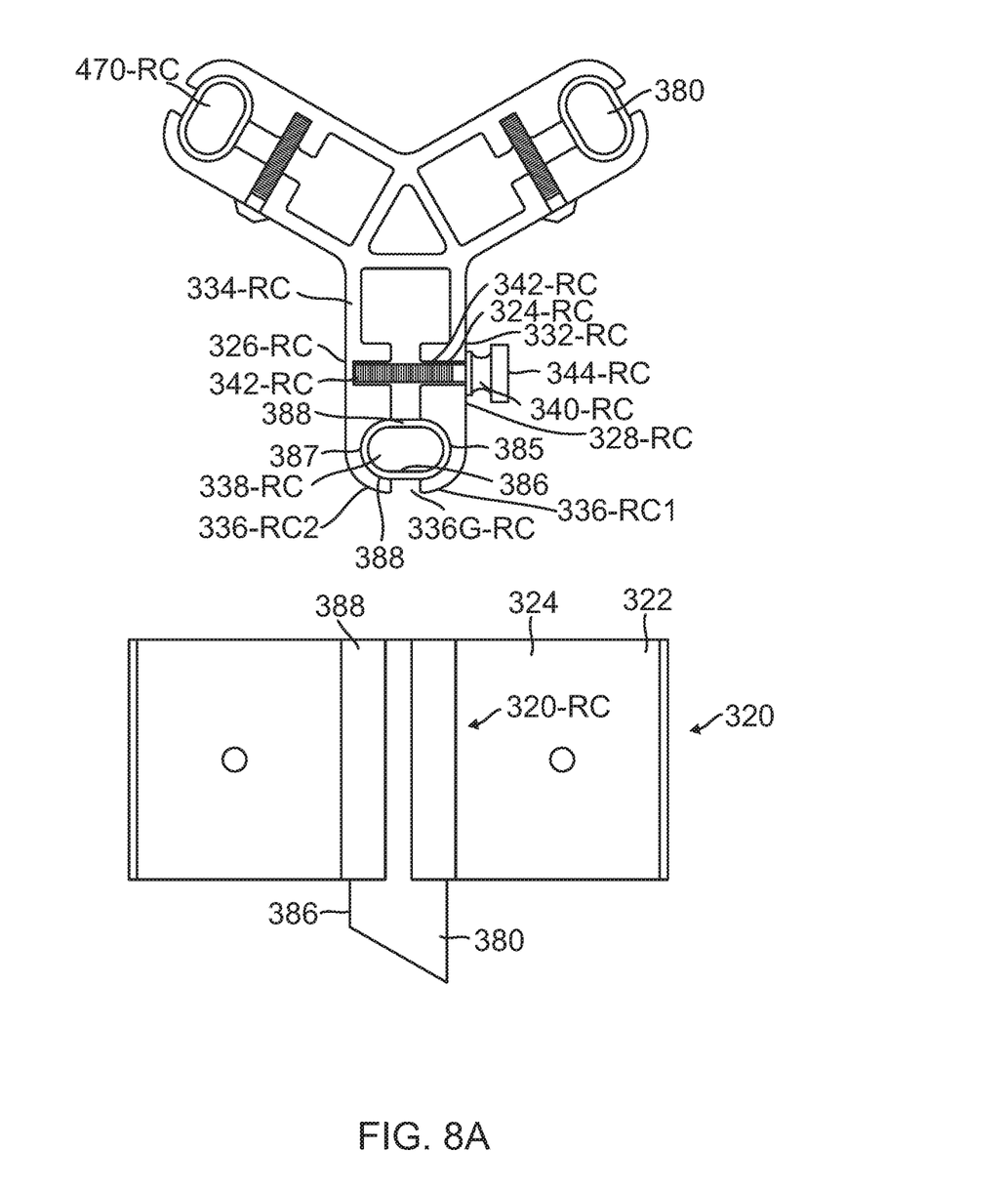
FIG. 8A is an exploded view with a front plan view of the lower plate of alternative embodiment of the present invention with a top plan view of the front height adjustment mechanism.

Referring to FIG. 8A, there is illustrated an exploded view with a front elevational view of the present invention lower level 320 lower front plate 322. As illustrated in the plan view behind the lower front plate 322, the front surface 324 is integrally formed with lower vertical height adjustment member retaining column 320-RC having a first transverse wall 332-RC, a parallel second transverse wall 334-RC and the arcuate front ends 336-RC1 and 336-RC2 with a central gap 336G-RC surrounding a generally oval opening 338-RC. The first transverse wall 332-RC includes a threaded opening 328-RC with a first interior threaded mating wall 324-RC through which a threaded retaining bolt 340-RC extends and ends a second interior threaded mating wall 326-RC. The threaded retaining bolt 340-RC includes a threaded shaft 342-RC and a head 344-RC. The threaded shaft 342-RC is threaded through threaded mating walls 324-RC and 326-RC and is stopped outside first transverse wall 332-RC by head 344-RC. The vertical height adjustment member 380 has an oval cross section 384 with oppositely disposed longitudinal flat surfaces 386 and 388 with rounded ends 385 and 387. The threaded retaining bolt 340-RC is tightened to cause the vertical height adjustment member 380 to be fixed in a given position.

The upper plate section 350 is identical to the first embodiment 50 and is retained at the top 382 of vertical height adjustment member 380 and retains the operational device 2000 in the same way previously described. When the operation on device 2000 is completed, the vertical height adjustment member 380 is raised to a location adjacent vertical wall 500-A and adjacent ceiling 530A. The threaded retaining bolt 340-RC is tightened as previously described to affix the upper plate 352 as previously described.

The one addition is that the height of lower plate 322 is adjustable. Each pole 370 and 390 is oval in cross section and is movably retained by lower plate adjustment members 470 and 490.

Figure 8B:
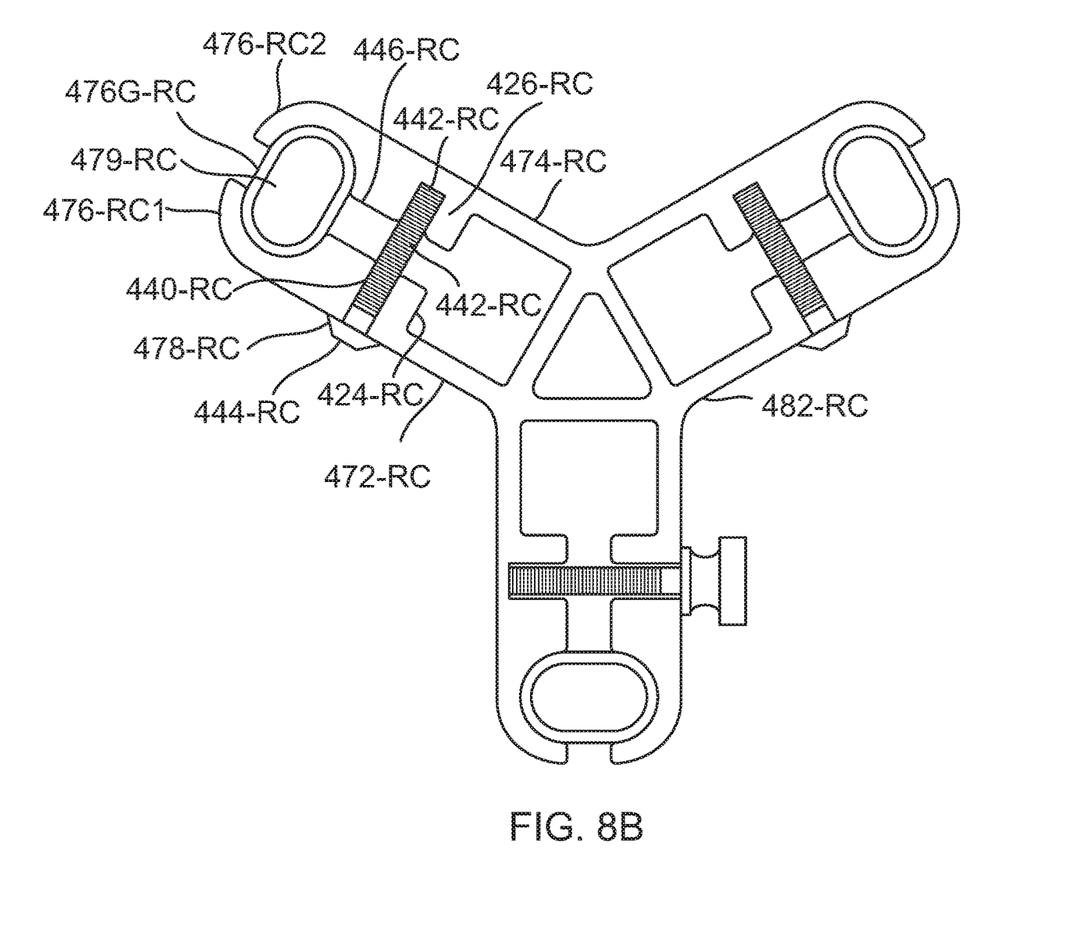
FIG. 8B is an exploded view with a front plan view of the lower plate of alternative embodiment of the present invention with a top plan view of the left pole height adjustment mechanism.

Referring to FIG. 8B, lower plate adjustment member includes a first transverse wall 472-RC, a parallel second transverse wall 474-RC and the arcuate front ends 476-RC1 and 476-RC2 with a central gap 476G-RC surrounding a generally oval opening 479-RC. The first transverse wall 472-RC includes a threaded opening 478-RC with a first interior threaded mating wall 424-RC through which a threaded retaining bolt 440-RC extends and ends a second interior threaded mating wall 426-RC. The threaded retaining bolt 440-RC includes a threaded shaft 442-RC and a head 444-RC. The threaded shaft 442-RC is threaded through threaded mating walls 424-RC and 426-RC and is stopped outside first transverse wall 432-RC by head 444-RC. The lower plate 322 is lowered on pole 370 to a desired height above plate 300 and threaded bolt 344-RC is tightened.

Figure 8C:
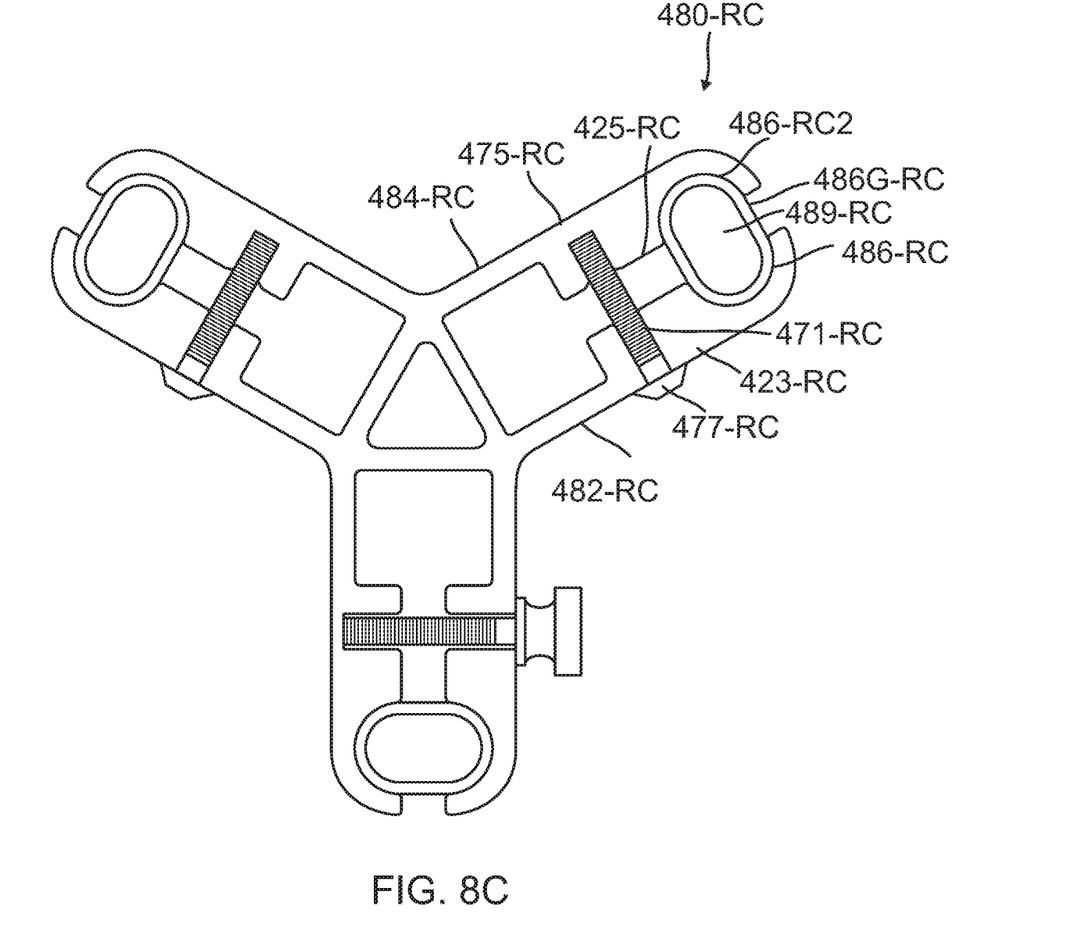
FIG. 8C is an exploded view with a front plan view of the lower plate of alternative embodiment of the present invention with a top plan view of the right pole height adjustment mechanism.

Referring to FIG. 8C, similarly, lower plate adjustment member for second pole 390 includes transverse wall 482-RC, a parallel second transverse wall 484-RC and the arcuate front ends 486-RC1 and 486-RC2 with a central gap 486G-RC surrounding a generally oval opening 489-RC. The first transverse wall 482-RC includes a threaded opening 488-RC with a first interior threaded mating wall 423-RC through which a threaded retaining bolt 475-RC extends and ends a second interior threaded mating wall 425-RC. The threaded retaining bolt 475-RC includes a threaded shaft 471-RC and a head 477-RC. The threaded shaft 471-RC is threaded through threaded mating walls 423-RC and 425-RC and is stopped outside first transverse wall 482-RC by head 477-RC. The lower plate 322 is lowered on pole 390 to a desired height above plate 300 and threaded retaining bolt 475-RC is tightened.

If the height of vertical height adjustment member 380 is too tall to enable lowering of first plate 322 and therefore second plate 352, it is also within the spirit and scope of the present invention for the vertical height adjustment member 380 to be hinged and folded upon itself to be shortened to accommodate lowering first and second plates.

Therefore, the present invention 310 not only enables a wheelchair bound person to work on a device 2000 which is positioned at an elevated height; but also adjusts the height of where the device is lowered for smaller wheelchair bound people.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus to enable a seated person who is a handicapped person in a wheel chair to install and service a device located adjacent a vertical wall and adjacent a ceiling of a room, the apparatus comprising:
   (a) a vertical height adjustment member formed in an elongated column having an oval cross-section including a first flat surface and a parallel opposite second flat surface, each flat surface terminating at one end in a first rounded end and terminating at an opposite end in a second rounded end, the vertical height adjustment member including a top end and a bottom end;
   (b) a lower section including:
      (i) a lower level plate having a multiplicity of openings which respectively receive a respective attaching member through which the lower level plate is affixed to the vertical wall at a location between forty-eight inches and fifty-two inches includes above a floor at a bottom of said vertical wall,
      (ii) the lower level plate having a front vertical height adjustment member retaining column having a first transverse wall, a parallel second transverse wall and an arcuate front end with a central gap surrounding a generally oval opening sized to receive said vertical height adjustment member,
      (iii) a threaded retaining bolt including a threaded shaft and a head, the first transverse wall including a threaded opening with a first interior threaded mating wall and a second interior threaded mating wall, (iv) the threaded shaft of the threaded retaining bolt is threaded through the threaded opening in the first transverse wall, threaded through the first interior threaded mating wall and threaded through the second interior threaded mating wall, and tightened to retain the vertical height adjustment member in place, with the head of the threaded retaining bolt stopped outside the first transverse wall;

(c) an upper level including:
  (i) an upper front plate having a rear surface integrally formed with an upper vertical height adjustment member retaining column having a first transverse wall, a parallel second transverse wall, an arcuate front end with a central gap surrounding a generally oval opening sized to receive said vertical height adjustment member, the upper vertical height adjustment member retaining column permanently retaining a top section adjacent the top end of the vertical height adjustment member through a first retaining pin inserted into an opening in one portion of the arcuate front end and into one rounded end of the vertical height adjustment member and a second retaining pin inserted into an opposite opening in a second portion of the arcuate front end and into an opposite rounded end of the vertical height adjustment member,
  (ii) the upper front plate including a multiplicity of openings to respectively receive a respective attaching member to attach a device to the upper front plate,
  (iii) said upper front plate is lowered by said vertical height adjustment member to be positioned in front of the lower front plate to enable the seated person to work on said device affixed to the upper front plate; and (d) after the work on the device is completed, the seated person pushes upwardly adjacent the bottom end of the vertical height adjustment member until the upper plate with attached device is adjacent a ceiling level and the threaded bolt in the lower level is tightened as described to enable the device to be in a fixed position adjacent the ceiling.

2. The apparatus in accordance with claim 1, further comprising: said device is battery operated.

3. The apparatus in accordance with claim 1, further comprising: said device is hard wired to an electrical outlet with a wire cable of sufficient length to reach said ceiling.

4. An apparatus to enable a seated person to work on a device located adjacent a vertical wall and adjacent a ceiling of a room, the apparatus comprising:
  (a) a vertical height adjustment member formed in an elongated column;
  (b) a lower section including:
    (i) a lower level plate having at least one opening to receive at least one attaching member through which the lower level plate is affixed to the vertical wall at a location above a floor at a bottom of said vertical wall,
    (ii) the lower level plate having a front vertical height adjustment member retaining column having walls which encircle an opening sized to receive said vertical height adjustment member,
    (iii) a threaded retaining bolt including a threaded shaft and a head, the first transverse wall including an opening with at least one interior threaded mating wall,
    (iv) the threaded shaft of the threaded retaining bolt inserted through the opening in the first transverse wall and threaded through the at least one mating wall and tightened to retain the vertical height adjustment member in place, with the head of the threaded retaining bolt stopped outside the first transverse wall; and
  (c) an upper level including:
    (i) an upper front plate having a rear surface integrally formed with an upper vertical height adjustment member retaining column having walls which encircle an opening sized to receive said vertical height adjustment member, a top section adjacent the top end of the vertical height adjustment member retained in the upper vertical height adjustment member retaining column,
    (ii) the upper front plate including at least one opening to receive at least one attaching member to attach a device to the upper front plate,
    (iii) said upper front plate is lowered by said vertical height adjustment member to be position in front of the lower front plate to enable the seated person to work on said device affixed to the upper front plate; and
  (d) wherein, after the work on the device is completed, the seated person pushes upwardly on the vertical height adjustment member until the upper plate with attached device is adjacent a ceiling level and the threaded bolt in the lower level is tightened as described to enable the device to be in a fixed position adjacent the ceiling.

5. The apparatus in accordance with claim 4, further comprising: said device is battery operated.

6. The apparatus in accordance with claim 4, further comprising: said device is hard wired to an electrical outlet with a wire cable of sufficient length to reach said ceiling.

* * * * *